(12) United States Patent
Bigelow

(10) Patent No.: US 8,578,663 B2
(45) Date of Patent: Nov. 12, 2013

(54) COVER FOR USE WITH AN INFLATABLE MODULAR STRUCTURE

(75) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 2597 days.

(21) Appl. No.: 10/700,808

(22) Filed: Nov. 4, 2003

(65) Prior Publication Data

US 2005/0091937 A1    May 5, 2005

(51) Int. Cl.
*E04H 12/18* (2006.01)
*E04H 12/00* (2006.01)

(52) U.S. Cl.
USPC .............. 52/111; 52/108; 52/440; 52/741.3

(58) Field of Classification Search
USPC ............ 52/2.22, 2.24, 2.17, 301, 5, 108, 121, 52/115, 3, 86, 783.13, 783.18, 783.1, 79.5, 52/79.9, 440, 741.3, 741.4, 745.05, 111, 52/113, 109, 117, 118, DIG. 13
See application file for complete search history.

(56) References Cited

U.S. PATENT DOCUMENTS

| | | | | |
|---|---|---|---|---|
| 1,603,182 A * | 10/1926 | Aborn | .................... | 296/146.4 |
| 1,958,296 A * | 5/1934 | Crow | ................... | 135/122 |
| 2,131,528 A * | 9/1938 | Soyer | ................... | 244/107 |
| 2,693,195 A * | 11/1954 | Frieder et al. | ............... | 135/122 |
| 3,300,910 A * | 1/1967 | Isaac | ................... | 52/2.19 |
| 3,364,632 A * | 1/1968 | Isaac | ................... | 52/2.22 |
| 3,432,609 A * | 3/1969 | Brion, Jr. et al. | ............ | 174/363 |
| 3,534,750 A * | 10/1970 | Kolozsvary | ............... | 135/132 |
| 3,548,904 A * | 12/1970 | MacKell | .................. | 53/473 |
| 3,984,142 A * | 10/1976 | Van Valkenburgh | ......... | 296/78.1 |
| 4,224,770 A * | 9/1980 | Petty | ................... | 52/82 |
| 4,375,876 A * | 3/1983 | Stewart | .................. | 244/129.5 |
| 4,485,991 A * | 12/1984 | Fuller | ................... | 244/49 |
| 4,531,330 A * | 7/1985 | Phillips | .................. | 52/2.21 |
| 4,557,144 A * | 12/1985 | Lucchini | ................. | 73/313 |
| 4,719,935 A * | 1/1988 | Gustafson | ............... | 135/124 |
| 4,736,762 A * | 4/1988 | Wayman | ................. | 52/2.14 |
| 4,939,874 A * | 7/1990 | Compton | ................ | 52/4 |
| 5,313,666 A * | 5/1994 | Bax et al. | ................ | 2/9 |
| 5,600,927 A * | 2/1997 | Kennon | .................. | 52/301 |
| 5,682,622 A * | 11/1997 | Tagg | .................... | 4/449 |
| 5,946,871 A * | 9/1999 | Kassardjian et al. | ......... | 52/301 |
| 6,021,614 A * | 2/2000 | Krieger | ................. | 52/301 |
| 6,115,971 A * | 9/2000 | Loebertmann et al. | ........ | 52/79.1 |
| 6,231,010 B1 | 5/2001 | Schneider et al. | | |
| 6,250,022 B1 * | 6/2001 | Paz et al. | ............... | 52/79.5 |
| 6,308,474 B1 * | 10/2001 | Wilson | ................... | 52/202 |

(Continued)

FOREIGN PATENT DOCUMENTS

| | | | | |
|---|---|---|---|---|
| JP | 6-136962 | * | 5/1994 | ............ 135/87 |
| WO | WO 84/02065 | * | 6/1984 | ............ 135/87 |

*Primary Examiner* — Phi A
(74) *Attorney, Agent, or Firm* — Franklin E. Gibbs

(57) ABSTRACT

A cover for an inflatable modular structure is claimed. A plurality of covers fit on the core of an inflatable module. An inflatable shell is attached to the core enclosing the covers and the core. In the pre-deployed configuration, the inflatable shell is folded over the covers and the covers provide a measure of protection for the shell. In the deployed state, the inflatable shell is filled with air and expands to its deployed configuration. The covers can be removed from core and attached to the inside of the shell. The covers then function as a platform to secure items in place.

21 Claims, 9 Drawing Sheets

(56) References Cited

U.S. PATENT DOCUMENTS

| | | |
|---|---|---|
| 6,367,496 B1 * | 4/2002 | Rempel et al. ................ 135/122 |
| 6,439,508 B1 | 8/2002 | Taylor |
| 6,547,189 B1 | 4/2003 | Raboin et al. |
| 6,672,744 B2 * | 1/2004 | DeLine et al. ................ 362/494 |
| 6,708,451 B1 * | 3/2004 | Gomes ........................... 52/2.17 |
| 6,860,069 B2 * | 3/2005 | Morris ........................... 52/2.22 |
| 6,892,497 B2 * | 5/2005 | Moon et al. .................... 52/79.1 |
| D571,021 S * | 6/2008 | Gebka ........................... D25/16 |

* cited by examiner

COVER FOR USE WITH AN INFLATABLE MODULAR STRUCTURE

BACKGROUND OF THE INVENTION

1. Field of the Invention

This invention relates to a cover for use with an inflatable modular structure. The inflatable modular structure can be used as a spaced based platform or a habitat for use on a planet or other extraterrestrial body.

2. Description of the Prior Art

Inflatable modular structures are well known in the art as typified, for example, by U.S. Pat. No. 6,439,508 to Taylor, U.S. Pat. No. 6,231,010 to Schneider, et al, and U.S. Pat. No. 6,547,189 to Raboin, et al.

A major advantage to inflatable structures is that while the internal volume of a typical rigid hulled craft does not vary once deployed into space, the opposite is true for the inflatable structure. Once deployed into orbit, or to an extraterrestrial mass, the inside of the inflatable structure is filled with gas or air. The flexible hull, or shell, expands in response to the gas and, as a result, the internal volume of the inflatable structure increases. Thus, the internal volume of an inflated structure having a flexible hull becomes substantially larger than the volume of a solid hulled structure where both structures have a similar launch payload volume.

This fact translates into a significant cost savings. A single inflatable structure can provide an internal volume equivalent to a number of solid hulled structures. With present costs at approximately $10,000.00 to deploy a single pound of payload into space, a single launch of an inflatable module would provide a volume comparable to a number of launches containing rigid hulled structures. Couple this with the fact that many launch payloads can be several tons in weight, it is immediately apparent that a reduced number of launches saves a considerable amount of money.

While inflatable structures offer a number of advantages to less flexible structures, there are, however, technological challenges to deploying an inflatable module. For example, the flexible hull must be collapsible so that the module can fit into payload compartment of a launch vehicle and secured in place as to prevent unwanted effects arising from the acceleration of a launch on an unsecured mass. This is referred to as the pre-deployment configuration and storage of the hull at this stage should be done in a way such that the launch should not damage the hull.

A typical flexible hull has a number of layers. The internal surface is usually composed of an air bladder. The air bladder acts as a barrier to keep gas internal to the module from escaping into space. A typical air bladder is not very thick and to function optimally it cannot have any leaks. When compacted for launch, it is important that the bladder does not come into contact with surfaces that could damage the hull.

An inflatable structure usually has a central core. The core is most often solid and runs the longitudinal length of the module. The core acts as a backbone to the structure and assists in, among other things, providing the shape to the structure and a framework for securing equipment.

To reduce the weight of the module, the core does not take the form of a solid hull. Rather, the core can be comprised of distal ends joined by a number of connecting elements such as longerons. In this form, the core is not designed to cooperate with a collapsed flexible hull. The core could have sharp edges or other protrusions that could damage the bladder of the hull.

At the launch stage, the bladder must be secured about the core in such a way as to minimize the opportunity for perforations, punctures, and tears in the bladder. One way to reduce the chance of damaging the bladder is to place a relatively smooth surface on the outside of the core so that the flexible hull could be folded around the surface without making contact with the core. The relatively smooth surface would be connected to the core and substantially surround the core to provide protection and support for the bladder. This surface could be part of a cover that is adapted to work with the core.

Another issue concerning the flexible hull is the use of windows. It is not unusual for a structure to have at least one window if not more integral to the flexible hull. As a flexible hull is usually comprised of a number of layers including, but not limited to, an orbital debris shield, a restraint layer, and a bladder, there must be an opening through each layer for viewing through the window. Furthermore, the window would be secured to at least one layer of the hull. When collapsing the hull for the launch configuration, care must be taken to insure that the window is properly indexed in relation to the rest of the hull (thereby minimizing the tension between the window and hull while collapsing the hull) and that the window does not break due to the forces exerted on the smooth surface of the cover.

This could be accomplished in a number of ways. The smooth surface of the cover can be partially flexible to bend to a degree rather than being rigid. Also, a buffer material such as rubber can be placed between the window and the smooth surface. As to properly indexing the window in relation to the rest of the hull, the smooth surface may have an access port, opening, or a hingable structure such as a door. The opening can be used to insure that the window is in the correct location and then the opening closed to provide a further degree of support.

One potential drawback to this approach arises due to the fact that the cover would restrict access from the core to the internal volume of the structure when the hull becomes inflated. Thus, whatever form the cover takes, it must be removable from the core to allow access to the full internal volume created by the hull when the module is deployed.

Another challenge lies in the characteristic of the internal surface of the flexible hull. While a rigid hull can function to secure equipment to the inside of a solid hull, the inside of the flexible hull is not so functional. Typically, the bladder forms the inside surface of an inflatable structure. The bladder does not have the structural qualities of a solid hull.

While the micro-gravity condition in space does not require the bladder to support the full weight of an item that may be attached to the surface of the bladder, nevertheless whatever comes into contact with the bladder might experience forces from other sources that could damage the bladder. One answer to this problem would be to secure a large panel to the inside surface of the bladder that conforms to the surface of the bladder and can support equipment without the equipment coming into contact with the bladder. The panel would serve to protect the bladder from contact with potentially damaging items and provide a foundation for securing items, such as equipment, in place.

Yet another challenge exists in the storage of materials and equipment at launch. While an inflatable module usually has a solid core, this does not mean that the core alone can function to store all the items needed in the structure. Furthermore, it may be necessary to distribute the weight at launch such that the core would not be an optimum place to contain storage items.

What is needed is a cover to provide a smooth surface for folding the bladder and flexible hull in the pre-deployed configuration. The cover would be substantially hollow for storing items prior to launch and during a mission. Further, the cover would be removable from the core after launch and during deployment. Finally, the surface of the cover would be contoured to conform to the inside surface of the bladder and securable to the bladder to protect the bladder and to act as a foundation for securing equipment, materials, or other items as needed.

SUMMARY OF THE INVENTION

This invention is directed to a cover for a modular structure. The inflatable modular structure has a core with at least two longerons and an inflatable shell and the inflatable shell has an internal surface that generally encloses both the longerons and a plurality of covers. The core has a plurality of attachment elements cooperating with the covers such that each cover is releasably attached to the core in the pre-deployed configuration. In that configuration the inflatable shell is folded over, and secured to, the covers such that the covers provide a measure of protection for the shell so that the shell does not come into contact with the core. In the deployed configuration the inflatable shell is pumped up with air and the covers are released from the core and removably attached to a plurality of affixing members disposed on the inside surface of the inflatable shell such that the covers serve as a foundation for securing items in place.

The cover has a first segment having a longitudinal axis, an interior surface, and having an arcuate exterior surface along the length of the longitudinal axis. The arcuate exterior surface of the first segment is adapted to provide support and protection for the folded inflatable shell during the pre-deployed configuration. The arcuate surface also has at least one affixing member for cooperating with an affixing member on the interior surface of the inflatable shell such that the arcuate exterior surface is removable attached to the interior surface of the inflatable shell during the deployed configuration.

There is also a second segment of the cover that has a substantially flat surface. The second segment is adapted to substantially secure items in place when the arcuate exterior surface is fastened to the interior surface of the inflatable shell in the deployed configuration.

Along with the first and second segments, the cover has a plurality of ribs disposed between, and joined to, the inner surface of the first segment and the substantially flat surface of the second segment. There are a number of attachment elements disposed on the ribs adapted to cooperate with the attachment elements on the core such that the cover is releasably attached to the core in the pre-deployed configuration.

DETAILED DESCRIPTION OF THE DRAWINGS

Figure 1:
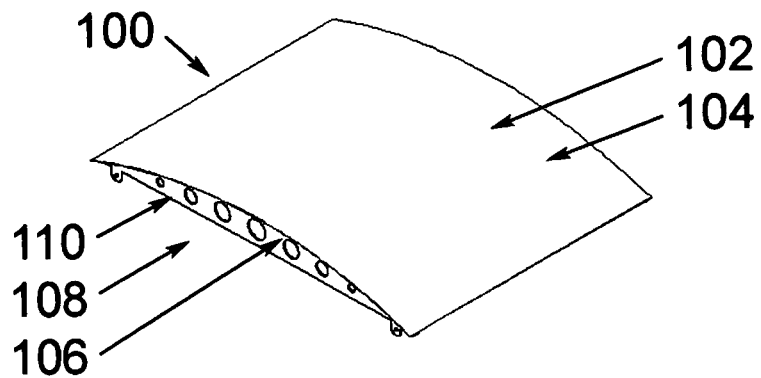
FIG. 1 is an isometric view of the top of a cover.

The present invention may best be understood by reference to the following description taken in conjunction with the accompanying drawings. FIG. 1 is an isometric view of a cover 100. The first segment 102 has an arcuate, or convex, exterior surface 104 and an interior surface 106. A second segment 108 is generally flat and is opposite to the first segment 102. A number of ribs 110 are secured to the interior surface 106 of the first segment 102 and the second segment 108. In the preferred embodiment, the first segment 102, second segment 108 and ribs 110 are made of a rigid material. The material is a metal such as aluminum and the ribs 110, interior surface 106 and second segment 108 are joined by know techniques such as welding or an adhesive materials. In the preferred embodiment; the exterior surface 104 is thin enough to allow for some flexibility. This is not, however, a limitation to the present invention and other materials, metal and non-metal composites of varying thickness can be used. In the preferred embodiment, the cover 100 is substantially hollow.

Figure 1A:
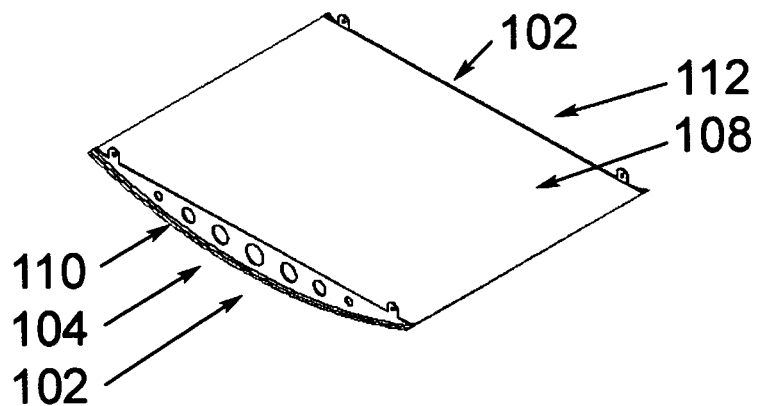
FIG. 1a is an isometric view of the top of a cover.
Figure 1B:
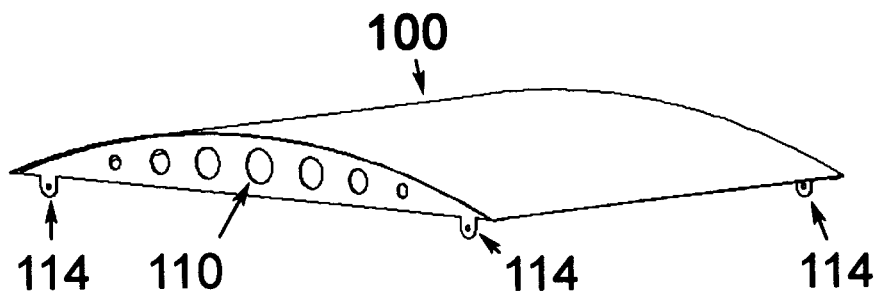
FIG. 1b is an isometric view of a cover showing attachment elements.
Figure 1C:
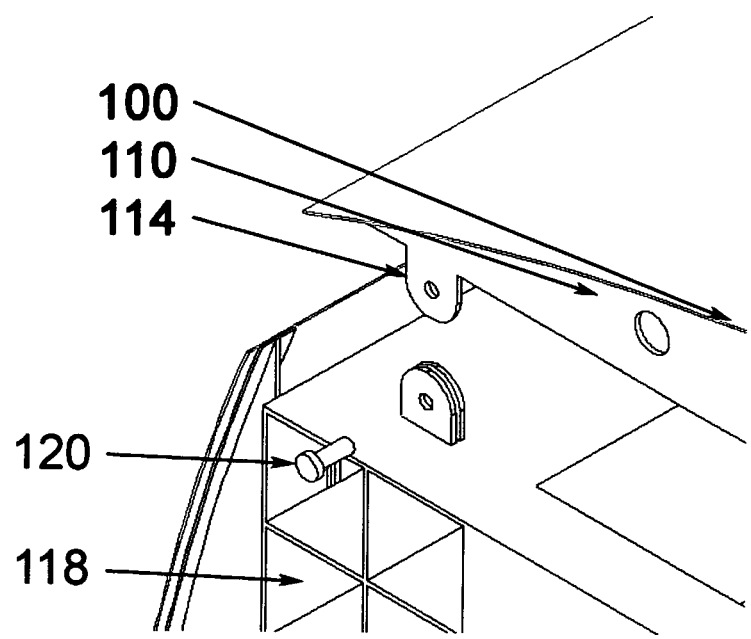
FIG. 1c is an exploded view of corresponding attachment elements.

Turning to FIG. 1a, the longitudinal axis 112 is shown exemplifying how the arcuate exterior surface 104 is perpendicular to the axis 112. In FIG. 1b, attachment elements 114 are secured to the ribs 110. In the preferred embodiment, the attachment element is a plate with a hole. FIG. 1c shows an attachment element 114 on the rib 110 and a corresponding attachment element 116 disposed on a longeron 118. The longeron 118 attachment element 116 in the preferred embodiment is a pair of opposing plates with holes that receive the rib 110 attachment element 114. In this configuration, attachment element 114 is sandwiched between the plates of attachment element 116. In this way, the holes align where a releasable pin 120 can be inserted through the holes to secure the cover 100 to the longeron 118.

The pin 120 can be released by an operator. This contemplates a pin that can be removed by mechanically by a crewmember or the use of an electromechanical device. The figure identifies attachment element 116 at one possible location on the longeron 118. However, attachment elements 114 and 116 can be oriented to cooperate on other locations on the longeron and the rib. The attachment elements 114 and 166 and the pin 120 are used in conjunction to allow the cover 110 to be releasably attached to the core in the pre-deployed configuration.

Figure 1D:
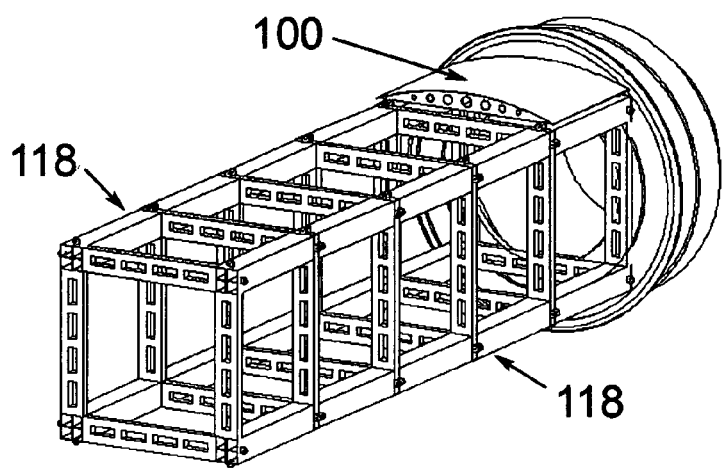
FIG. 1d is a partial isometric view of a cover on two longerons.
Figure 1E:
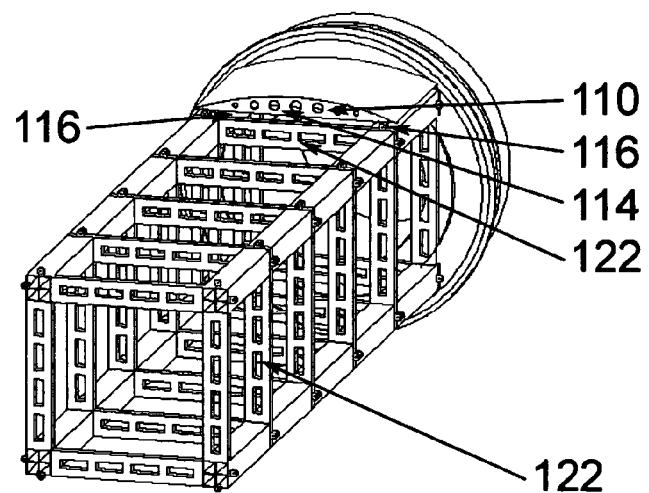
FIG. 1e is a partial isometric view of a cover attached to braces.

As shown in FIG. 1d, the cover fits over two adjacent longerons 118. FIG. 1e depicts the situation where a brace 122 has an attachment element 116 that cooperates with the rib 110 attachment element 114. The attachment elements can also include latching mechanisms and other well-known mechanical and electromechanical devices for securing the cover to the longerons or braces. FIGS. 1*d* and 1*e* show the cover attached to braces and longerons. That is because the core in the preferred embodiment utilizes. Other core configurations may dictate that the covers be attached to other support structures not identified in these figures.

Figure 2:
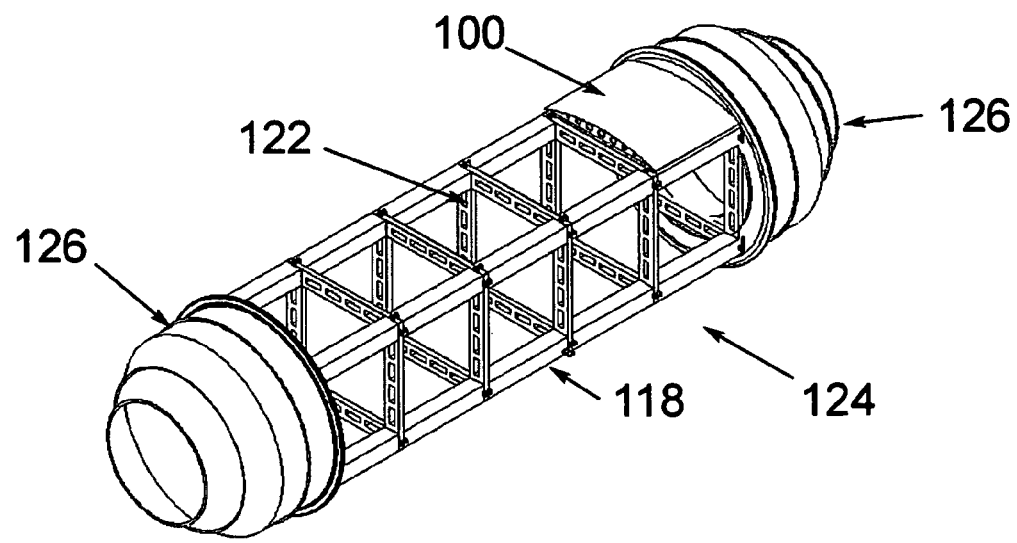
FIG. 2 is a partial isometric view of a cover on two longerons.
Figure 2A:
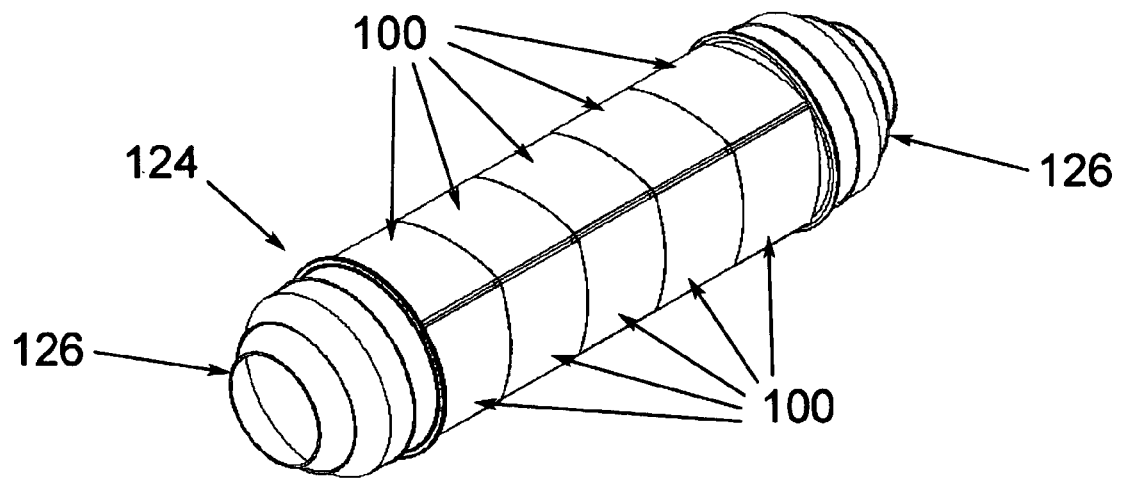
FIG. 2a is an isometric view of the core with covers.
Figure 3:
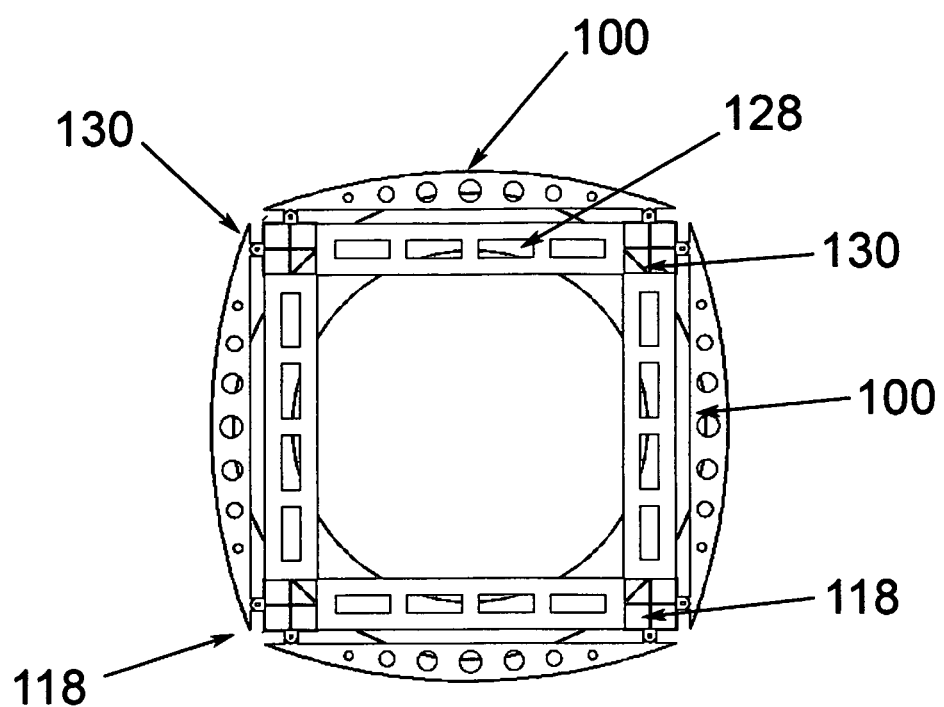
FIG. 3 is a cross-sectional view of the core
FIG. 4; is a cross-sectional view of the core with an inflatable shell in the pre-deployed configuration.

Addressing FIG. 2, a cover 100 is shown with the core of an inflatable modular structure 124. The core 124 in this figure is comprised of a number of longerons 116, braces 122, and opposing distal ends 126. This is the preferred embodiment of the core 124. In this configuration, the cover 100 extends over two adjacent longerons 118. FIG. 2*a* shows the core 124 with a number of covers 100 extending substantially the length of the longerons. FIG. 3 is a cross section of the core 124 and shows how a number of covers 100 would be used in the preferred embodiment. As shown in FIG. 3, the width of the covers 128 extends substantially to the outer edges of each longeron 130.

Figure 4:
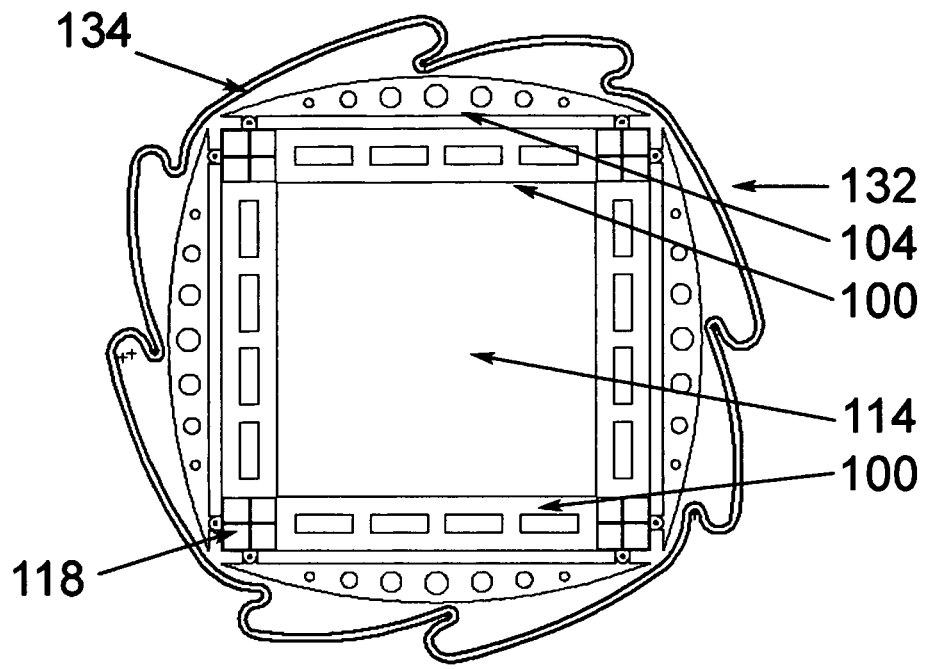

Turning to FIG. 4, the inflatable shell 132 has an internal surface 134 that surrounds or generally encloses the longerons 118 of the core and a number of covers 100. Since the inflatable shell is attached to the distal ends and does not completely cover the distal ends, but rather the longerons 116, the shell 132 is said to generally enclose the core. It is also correct to state that the shell 132 generally encloses the longerons 118 as the longerons may extend into the distal ends in alternate embodiment. The shell 132 is usually comprised of a number of layers including, but not limited to, an orbital debris shield, a restraint layer, and a bladder. While these layers are not displayed herein, they are referenced to indicate that the shell 132 is not limited to a particular set of layers or construction.

FIG. 4 also depicts how the shell 132 can be folded over the covers 100. The number of folds depends upon a number of variables such as the thickness of the shell 132 and the overall dimensions of the structure. Once folded, the shell 132 can be secured in place by any number of convention means including, but not limited to, being tied with straps. The covers 100 insulate the shell 132 from coming into contact with the core including the longerons 118. The arched surface of the cover 104 provides a relatively smooth and supportive structure for the folded shell. When the shell 126 is folded over the covers 100 and secured into place, the inflatable modular structure would be in the pre-deployed configuration. In this configuration, the shell and core would be secured to fit into the payload section of a launch vehicle.

Figure 5:
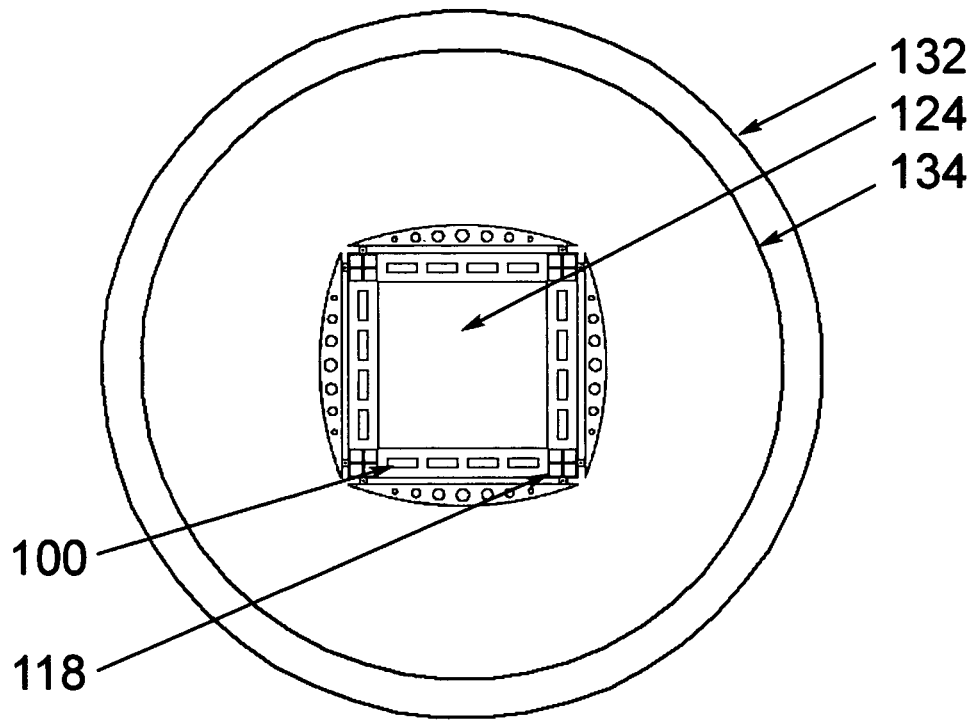
FIG. 5 is a cross-sectional view of the core with the inflatable shell in the deployed configuration.

FIG. 5 depicts the inflatable shell 132 filled with air and expanded to its fullest form. This would be the case where the modular structure was deployed into space or an extraterrestrial mass and inflated. This is the deployed configuration.

Figure 6:
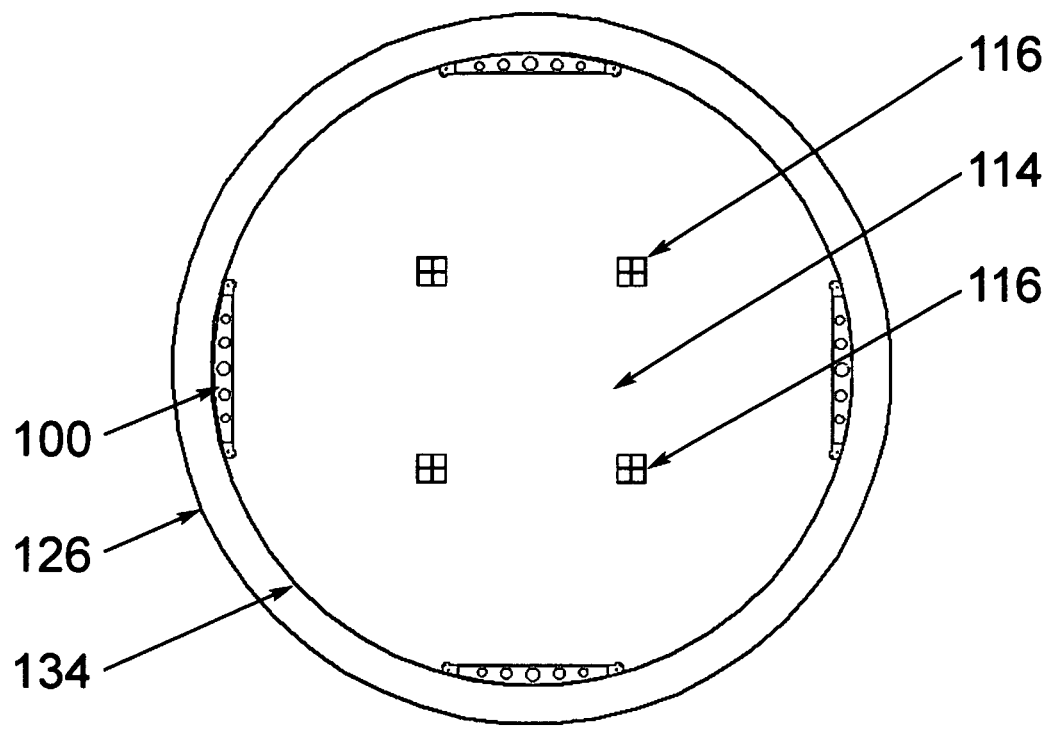
FIG. 6 is a cross-sectional view of the core with the covers in the deployed configuration.
Figure 6A:
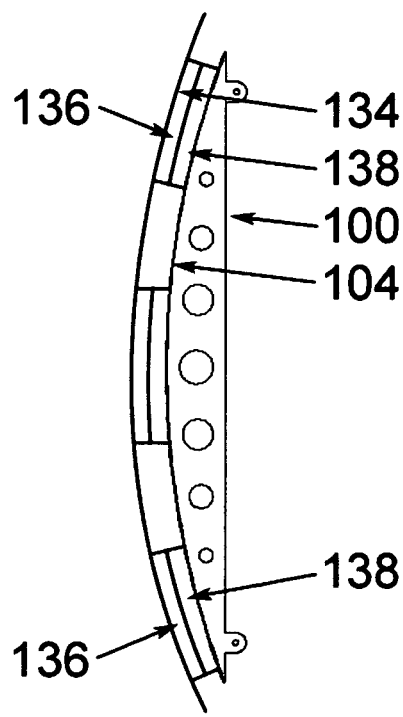
FIG. 6a is a side view of a cover attached to the internal surface of an inflatable shell.
Figure 6B:
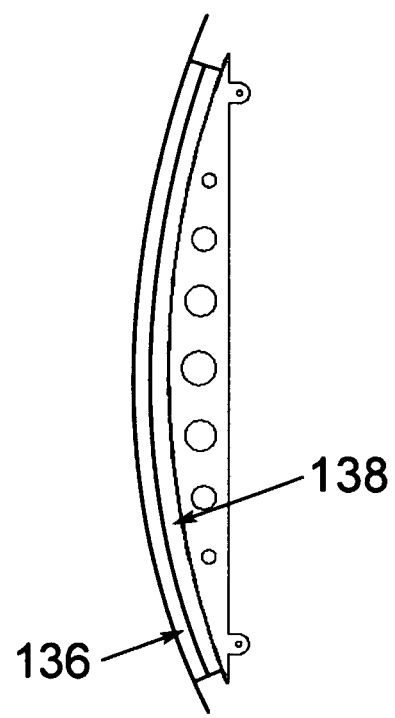
FIG. 6b is a side view of a cover attached to the internal surface of an inflatable shell.

Now addressing FIG. 6, in the deployed configuration, the covers are placed on the internal surface of the flexible shell 134. FIG. 6*a* shows the interaction between an affixing member 136 attached to the internal surface 134 and an affixing member 138 on the arcuate surface 104 of the cover 100. The affixing member 138 on the arcuate surface is referred to as the first affixing member and the affixing member 136 on the internal surface is referred to as the second affixing member. The figure shows how the arc of the arcuate surface 104 conforms to the arc on the internal surface of the flexible shell 134. This exemplifies the preferred embodiment. Further, the affixing members run along the longitudinal axis of the cover 100. FIG. 6*b* shows the affixing members running perpendicular to the longitudinal axis of the cover 100. This is the preferred embodiment.

In the preferred embodiment, the affixing members 136 and 138 are made of Velcro. However, other types of affixing members such as, but not limited to, magnetic strips could be used. In any case, the cover 100 is removably attached in this way to the internal surface 134.

Figure 6C:
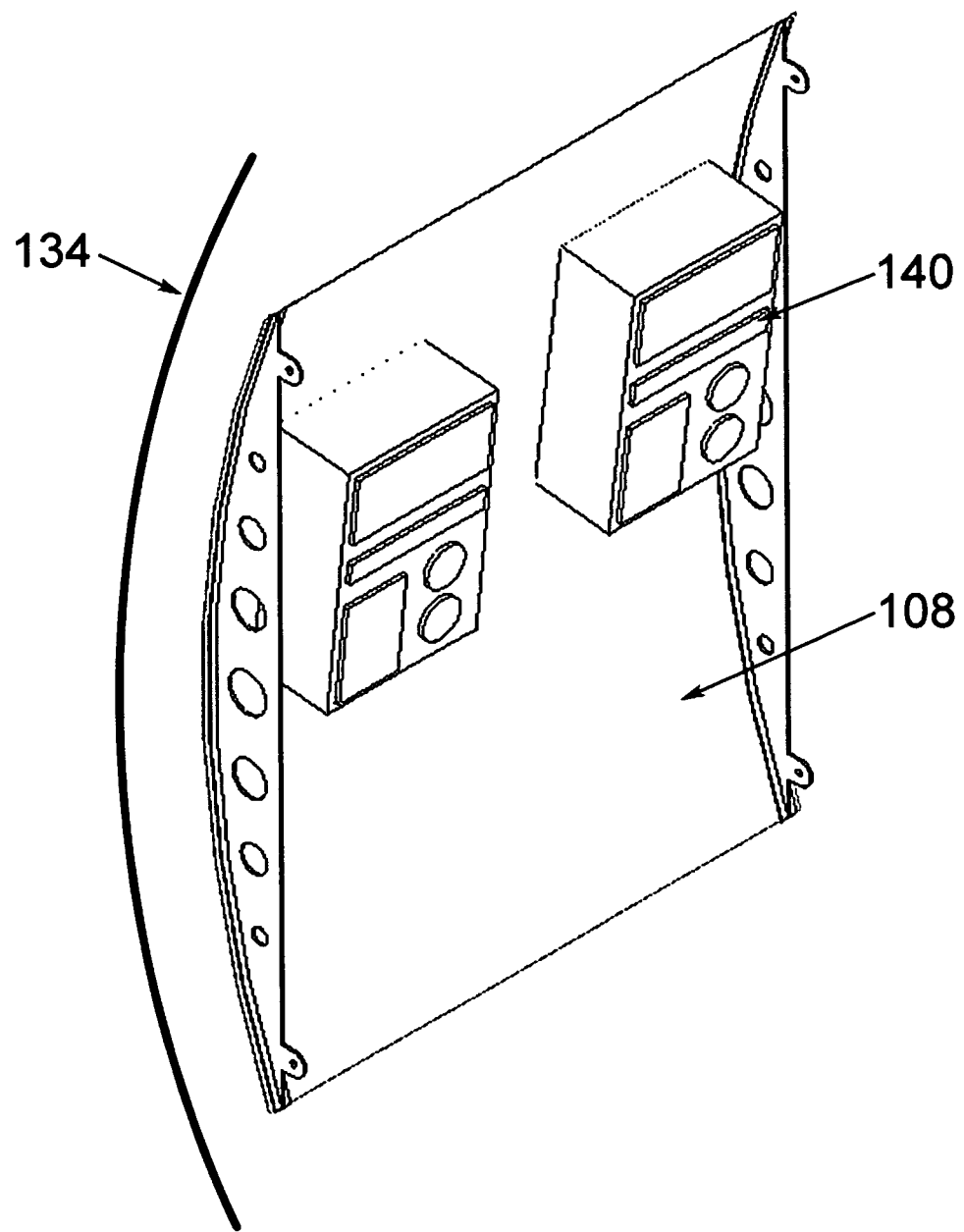
FIG. 6c is an isometric view of a cover with items secured in place.

Once the cover 100 is removably secured in place on the internal surface of the shell 134, the cover can be used to secure other items in place. This is exemplified in FIG. 6*c*. The second segment 108 of the cover 100 is show with items 134 attached to the segment 108. Attachment can be accomplished by a number of conventional means including, but not limited to, the use of Velcro fasteners, hooks and eyelets, bolts and screws, and magnetic strips.

Figure 7:
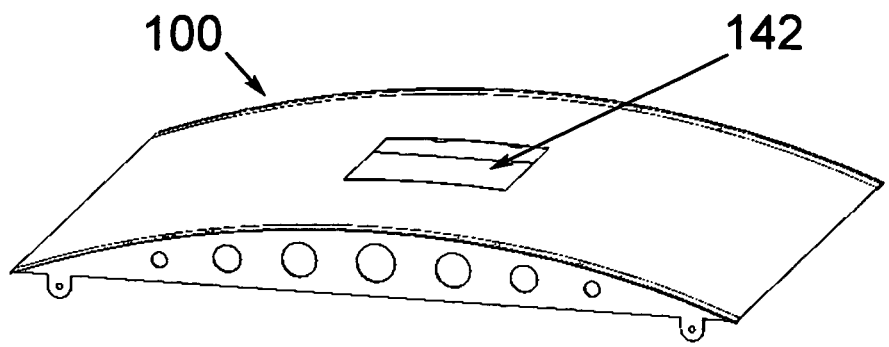
FIG. 7 is an isometric view of a cover identifying a door on the arcuate surface.
Figure 8:
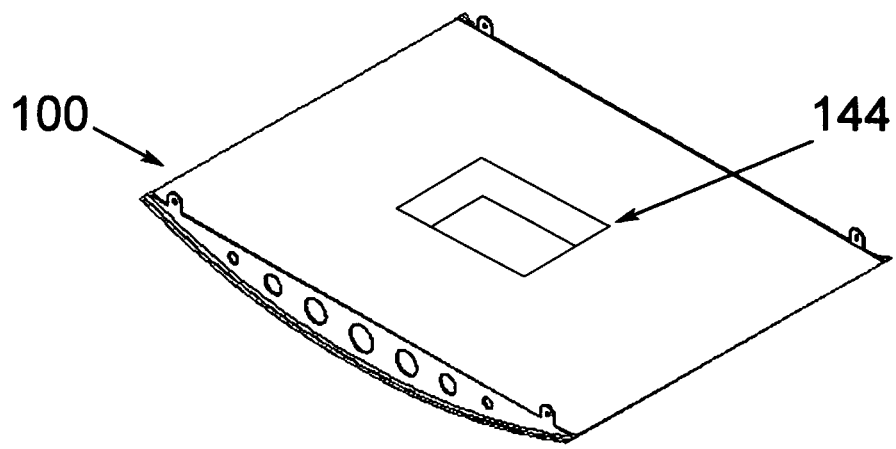
FIG. 8 is an isometric view of a cover identifying a door on the second segment.

Turning now to FIG. 7, the cover 100 can include an access opening 142 that is identified in the figure as a door on the first segment 102. This is the preferred embodiment, however the access opening can take other forms such as a sliding door or removable panel. In FIG. 8 the second segment 108 is shown with an access opening 144 depicted as a hingable door. Again, this is the preferred embodiment for an access opening, however the access opening can take other forms such as a sliding door or removable panel. The access openings, in this case the doors, serve multiple purposes. First, they allow access into the cover 100 for storing and retrieving items.

Figure 9:
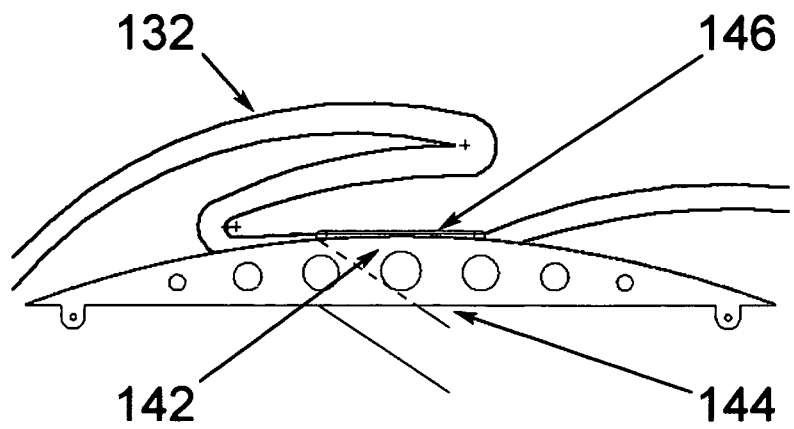
FIG. 9 is a cross-sectional view of the cover in contact with a window.

Another purpose of the access openings is shown in FIG. 9. A typical module will have at least one window 146 integrated with the flexible shell 132. When the shell 132 is folded into the pre-deployed configuration, care must be taken to locate the window 146 in a position such that the folding will not damage the window 146. When access openings 142 and 144 are open, the exact location of the window can be determined and the folding can be done such that the window 146 is less likely to be damaged. In the figure, the doors hinge by any number of known conventional hinging means and can be secured in place by the use of such items as bolts, locks, and latches in conjunction with the cover.

There has thus been described a novel cover for use with an inflatable modular structure. It is important to note that many configurations can be constructed from the ideas presented. The foregoing disclosure and description of the invention is illustrative and explanatory thereof and thus, nothing in the specification should be imported to limit the scope of the claims. Also, the scope of the invention is not intended to be limited to those embodiments described and includes equivalents thereto. It would be recognized by one skilled in the art the following claims would encompass a number of embodiments of the invention disclosed and claimed herein.

What is claimed is:

1. A cover for use with an inflatable modular structure, the inflatable modular structure having a core with at least two longerons and a plurality of attachment elements disposed thereon for cooperating with a plurality of covers such that each cover is releasably attached to the core in the pre-deployed configuration, an inflatable shell attached to the core, the inflatable shell having an internal surface that generally encloses the longerons and the plurality of covers, and in the pre-deployed configuration the inflatable shell is folded over, and secured to, the covers, and in the deployed configuration the inflatable shell is pumped up with air, unfolded from the covers, the covers subsequently released from the core and the covers being removably attached to a plurality of affixing members disposed on the inside surface of the inflatable shell such that the covers serve as a foundation for securing items in place, the cover comprising:

a first segment of at least one substantially sheet like and substantially rigid structure and having a longitudinal axis, an interior surface, and having an arcuate exterior surface disposed generally opposite of the interior surface and perpendicular to the length of the longitudinal axis, the arcuate exterior surface of the first segment being adapted to provide protection to the inflatable shell from unwanted contact with the core during the pre-deployed configuration and the arcuate exterior surface having at least one affixing member for cooperating with at least one affixing member on the interior surface of the inflatable shell such that the arcuate exterior surface is removably attached to the interior surface of the inflatable shell during the deployed configuration;

a second segment having a substantially flat surface and the second segment being adapted to substantially secure items in place when the arcuate exterior surface is fastened to the interior surface of the inflatable shell in the deployed configuration; and a plurality of ribs disposed between, and joined to, the inner surface of the first segment and the substantially flat surface of the second segment, and a plurality of attachment elements disposed on the ribs adapted to cooperate with the attachment elements on the longeron such that the cover is releasably attached to the core in the pre-deployed configuration.

2. A cover for use with a core of an inflatable modular structure, the core having a plurality of attachment elements, the cover comprising:

a first segment of at least one substantially sheet like and substantially rigid structure and having a longitudinal axis, an interior surface, and having an arcuate exterior surface disposed generally opposite of the interior surface and perpendicular to the length of the longitudinal axis;

a second segment having a substantially flat surface;

a plurality of ribs disposed between, and joined to, the inner surface of the first segment and the substantially flat surface of the second segment and the ribs having a plurality of attachment elements; and the attachment elements on the ribs cooperating with the attachment elements on the core such that the cover is removably attached to the core.

3. The cover of claim 2 wherein the core further comprises at least two longerons and the cover has a width and each longerons having an outer edge and the width of the cover is substantially the distance between the outer edges of the longerons and the cover fits over the longerons.

4. The cover of claim 2 wherein the second segment is substantially rigid.

5. The cover of claim 2 wherein the cover is substantially hollow.

6. The cover of claim 2 wherein the first segment has an access opening.

7. The cover of claim 2 wherein the second segment has an access opening.

8. A method of using a cover with a core of an inflatable modular structure having a plurality of attachment elements thereon and an inflatable shell which utilizes the cover of claim 2.

9. A cover for use with at least two braces of a core of an inflatable modular structure, the braces having a plurality of attachment elements, the cover comprising:

a first segment of at least one substantially sheet like and substantially rigid structure and having a longitudinal axis, an interior surface, and having an arcuate exterior surface disposed generally opposite of the interior surface and perpendicular to the length of the longitudinal axis;

a second segment having a substantially flat surface;

a plurality of ribs disposed between, and joined to, the inner surface of the first segment and the substantially flat surface of the second segment and the ribs having a plurality of attachment elements; and the attachment elements on the ribs cooperating with the attachment elements on the braces such that the cover is removably attached to the braces.

10. The cover of claim 9 wherein the core further comprises at least two longerons and the cover has a width and each longeron having an outer edge and the width of the cover is substantially the distance between the outer edges of the longerons and the cover fits over the longerons.

11. The cover of claim 9 wherein the second segment is substantially rigid.

12. The cover of claim 9 wherein the cover is substantially hollow.

13. A method of using a cover of claim 9 with a core of an inflatable modular structure having a plurality of braces and attachment elements disposed thereon and an inflatable shell comprising the steps of;

attaching a plurality of covers to the core in a pre-deployed configuration;

folding the inflatable shell about the covers in the pre-deployed configuration;

unfolding the inflatable shell in the deployed configuration;

inflating the inflatable shell in the deployed configuration;

detaching the covers from the core in the deployed configuration; and attaching the covers to the inflatable shell in the deployed configuration.

14. A cover for use with at least two longerons of a core of an inflatable modular structure, the longerons having a plurality of attachment elements, the cover comprising:

a first segment of at least one substantially sheet like and substantially rigid structure and having a longitudinal axis, an interior surface, and having an arcuate exterior surface disposed generally opposite of the interior surface and along the length of the longitudinal axis; a second segment having a substantially flat surface;

a plurality of ribs disposed between, and joined to, the inner surface of the first segment and the substantially flat surface of the second segment and the ribs having a plurality of attachment elements; and the attachment elements on the ribs cooperating with the attachment elements on the longerons such that the cover is removably attached to the longerons.

15. The cover of claim 14 wherein the cover has a width and each longeron having an outer edge and the width of the cover is substantially the distance between the outer edges of the longerons.

16. The cover of claim 14 wherein the second segment is substantially rigid.

17. The cover of claim 14 wherein the first segment has an access opening.

18. The cover of claim 14 wherein the second segment has an access opening.

19. The cover of claim 14 wherein the cover is substantially hollow.

20. A method of using a cover of claim 14 with a core of an inflatable modular structure having a plurality of longerons and attachment elements disposed thereon and an inflatable shell comprising the steps of;

attaching a plurality of covers to the core in a pre-deployed configuration; folding the inflatable shell about the covers in the pre-deployed configuration;

unfolding the inflatable shell in the deployed configuration;

inflating the inflatable shell in the deployed configuration;

detaching the covers from the core in the deployed configuration; and attaching the covers to the inflatable shell in the deployed configuration.

21. A cover for being removably attached to a core of an inflatable modular structure having attachment elements disposed thereon, the cover comprising:
- a first segment of at least one substantially sheet like and substantially rigid structure and having a longitudinal axis, an interior surface, and having an arcuate exterior surface disposed generally opposite of the interior surface and perpendicular to the length of the longitudinal axis;
- a second segment having a substantially flat surface; and
- a plurality of ribs disposed between, and joined to, the inner surface of the first segment and the substantially flat surface of the second segment and the ribs having a plurality of attachment elements for cooperating with the attachment elements on the core.

* * * * *